United States Patent
Feder et al.

(10) Patent No.: US 8,213,331 B2
(45) Date of Patent: Jul. 3, 2012

(54) MANAGING DATA TRANSFER IN A NETWORK ENVIRONMENT

(75) Inventors: Oshrit Feder, Kfar-Saba (IL); Abel Gordon, Haifa (IL); German Goft, Pardes Hana Karkur (IL)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 12/636,744

(22) Filed: Dec. 13, 2009

(65) Prior Publication Data
US 2011/0142055 A1    Jun. 16, 2011

(51) Int. Cl.
*G01R 31/08*    (2006.01)
(52) U.S. Cl. .................. 370/252; 370/400; 370/392
(58) Field of Classification Search .................. None
See application file for complete search history.

(56) References Cited

U.S. PATENT DOCUMENTS

| | | | |
|---|---|---|---|
| 2006/0045099 A1* | 3/2006 | Chang et al. | 370/400 |
| 2008/0244204 A1 | 10/2008 | Cremelie et al. | |
| 2008/0294696 A1 | 11/2008 | Frandzel | |
| 2010/0094817 A1* | 4/2010 | Ben-Shaul et al. | 707/697 |

OTHER PUBLICATIONS

EMC co., "Efficient Data Protection with EMC Avamar Global Deduplication Software", 2009.

\* cited by examiner

*Primary Examiner* — Duc C Ho
(74) *Attorney, Agent, or Firm* — F. Jason Far-hadian; Century IP Group

(57) ABSTRACT

A method for managing data transfer in a network environment, the method is provided. The method comprises receiving a request to transfer first data from a first source in a source domain comprising a plurality of sources to a first target in a target domain comprising a plurality of targets. If the first source is configured to transfer data in a first mode or if the first source is configured to transfer data in a second mode and the first data has previously been transferred to the target domain, a signature of the first data is transferred to the first target instead of the first data. If the first source is configured to operate in the second mode and the first data has not previously been transferred to the target domain, the first data is transferred to the first target.

24 Claims, 15 Drawing Sheets

MANAGING DATA TRANSFER IN A NETWORK ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The disclosed subject matter relates generally to managing data transfer in a network environment and, more particularly, to managing data transfer between multiple sources and multiple targets in a network environment.

BACKGROUND

In a network environment, a first computing system may request data from a source computing system, and the source computing system may transfer the data to the first computing system to service the request. If a second computing system, in a peer-to-peer data transfer relationship with the first computing system, requests the same data from the source computing system, the first computing system may be used to transfer all or part of the data to the second target computing system, instead or in conjunction with the source computing system.

Existing implementations for managing transfer of data in a peer-to-peer network environment generally support transfer of static data (i.e., data that does not require frequent updates). Such implementations fail to support collaboration between the computing systems to enhance or improve the efficiency of the data transfer process.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for managing data transfer in a network environment, the method is provided. The method comprises receiving a request to transfer first data from a first source in a source domain comprising a plurality of sources to a first target in a target domain comprising a plurality of targets. If the first source is configured to transfer data in a first mode or if the first source is configured to transfer data in a second mode and the first data has previously been transferred to the target domain, a signature of the first data is transferred to the first target instead of the first data. If the first source is configured to operate in the second mode and the first data has not previously been transferred to the target domain, the first data is transferred to the first target.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
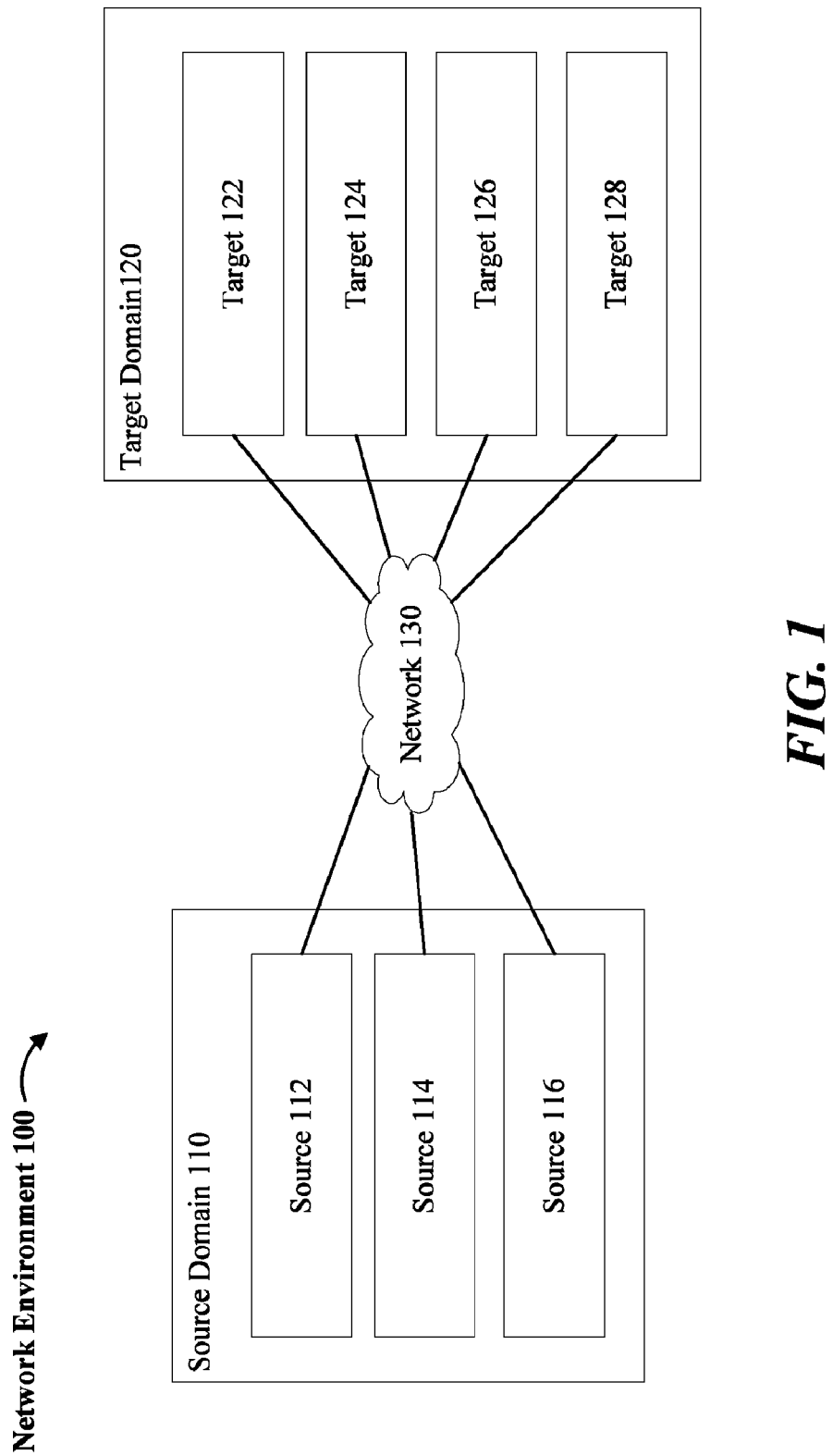
FIG. 1 illustrates an exemplary network environment, in accordance with one or more embodiments.

Referring to FIG. 1, in accordance with one or more embodiments, an exemplary network environment 100 comprises a source domain 110 including one or more source nodes 112, 114, 116 and a target domain 120 including one or more target nodes 122, 124, 126, 128. The source nodes may transfer data to the target nodes over a network 130. In one embodiment, network 130 may comprise a peer-to-peer network in which a target node may act as a source node and may thus transfer data to another node in the network 130. It is noteworthy that the data transferred between nodes in the network environment 100 may comprise static data (i.e., infrequently updated data), non-static data (i.e., frequently updated data), or a combination thereof.

Data transfer operations among the nodes in network 130 may be dependent on a designated data transfer mode. The data transfer mode may be set or determined based on source side cloud topologies or costs, status of sources or targets, or other dynamically changing factors. For example, a first mode (e.g., a pessimistic mode) may be desirable for a primary source with decreased transfer costs, and a second mode (e.g., an optimistic mode) may be desirable for a secondary source with limited network bandwidth. The optimistic mode may also be desirable for a new, migrating, or reviving source that is not synchronized with a target that has previously received most of the data chunks to be transferred by the source.

In a pessimistic mode, data is directly transferred from a designated source (e.g., the original source of the data) to a destination target. In contrast, in an optimistic mode, the data transfer to a target node may be from a peer node instead of the original source of the data and involve the transfer of a signature of the data rather than the actual data itself. A signature refers to a value that may be utilized to uniquely identify a data chunk such that identical copies of the data chunk have the same value. For example, in one implementation, a signature of a data chunk may be a hash value generated from the data chunk during a de-duplication process.

Figure 2:
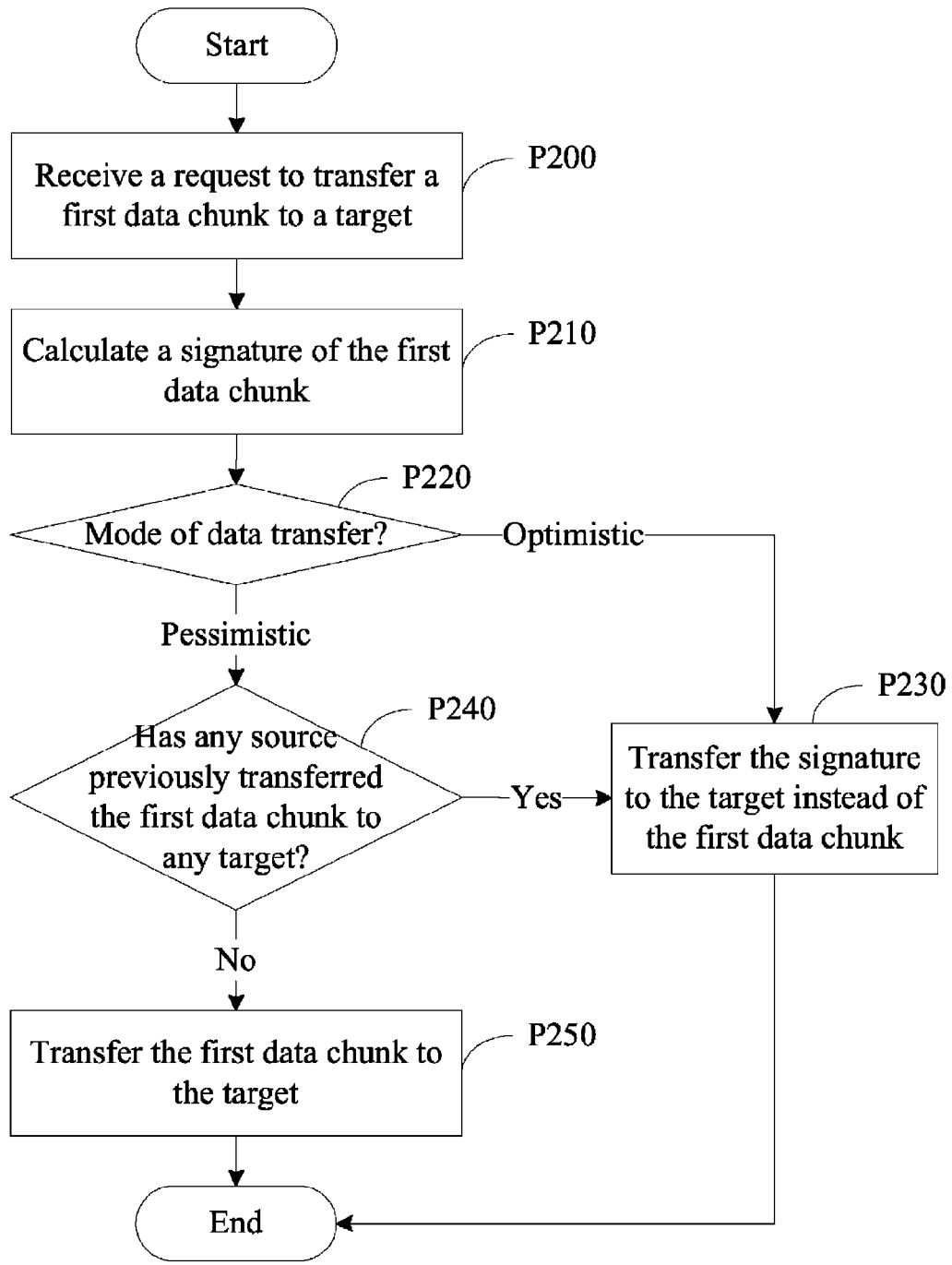
FIG. 2 is a flow diagram of a method for transferring a data chunk to a target, in accordance with one embodiment.

Referring to FIGS. 1 and 2, in accordance with one embodiment, the source domain 110 may receive a request to transfer data (e.g., a first data chunk) to target 122 (P200). In response to the request, the source domain 110 calculates a signature of the first data chunk and determines the mode in which data transfer is to be performed (P210, P220). If source 112 receives the request while in an optimistic mode, the source domain 110 (e.g., source 112, 114, or 116) transfers the signature of the first data chunk to target 122 instead of the first data chunk (P230).

If source 112 receives the request while in a pessimistic mode, the source domain 110 determines whether the source domain 110 has previously transferred the first data chunk to the target domain 120 (P240). That is, the source domain 110 determines whether any source (e.g., source 112, 114, or 116) has previously transferred the first data chunk to any target (e.g., targets 122, 124, 126, 128). If the source domain 110 has previously transferred the first data chunk to the target domain 120, the source domain (e.g., source 112, 114, or 116) transfers the signature of the first data chunk to target 122 instead of the first data chunk (P230).

Otherwise, source 112 transfers the first data chunk to target 122 (P250). In one implementation, a repository shared by sources 112, 114, and 116 may be utilized to determine whether any source has previously transferred a data chunk to any target. The shared repository may maintain a history of data chunks transferred to the target domain 120, as provided in further detail below.

Figure 3:
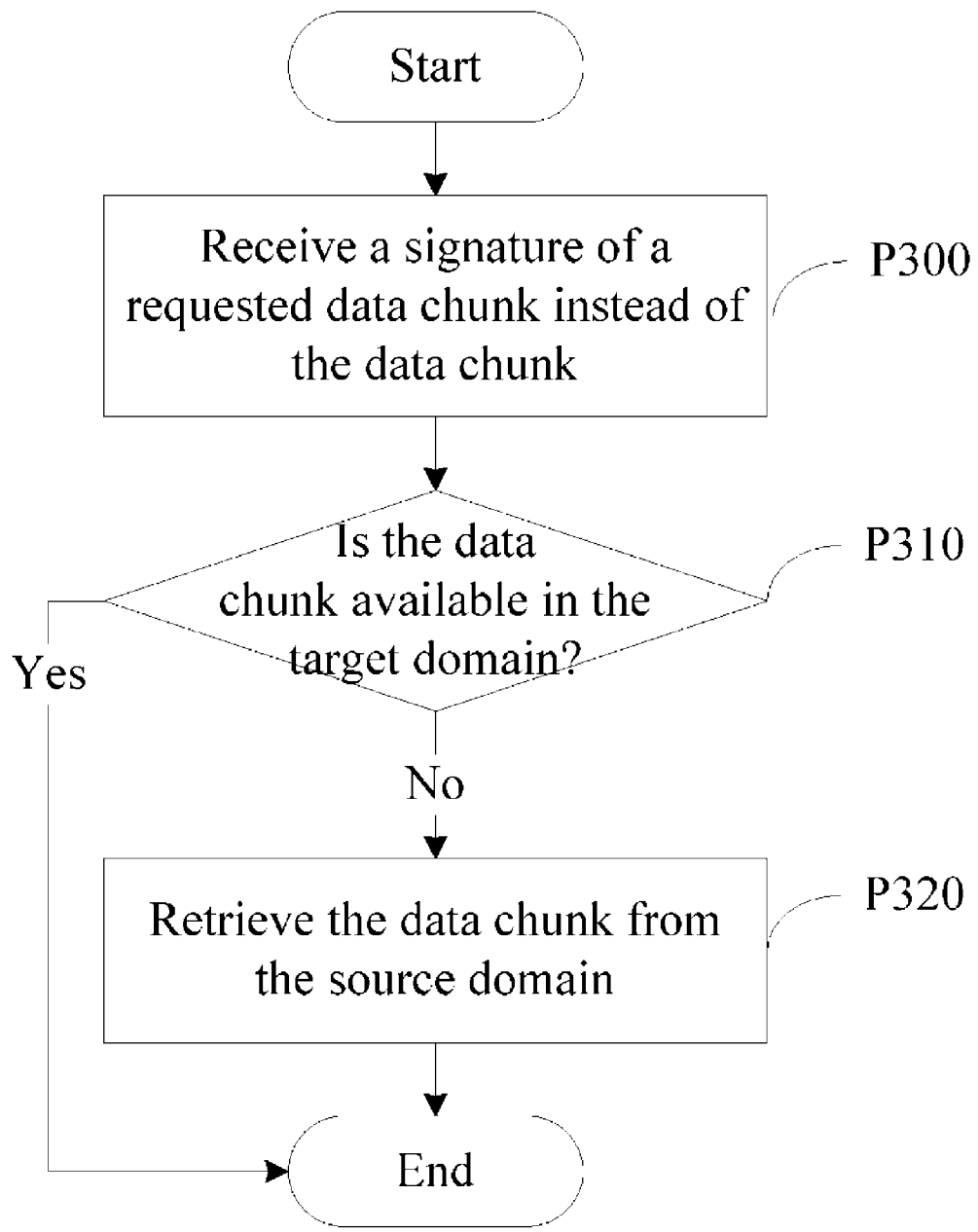
FIG. 3 is a flow diagram of a method for processing a signature received from a source, in accordance with one embodiment.

Referring to FIGS. 1 and 3, in accordance with one embodiment, target 122 may receive a signature of a first data chunk instead of the first data chunk (P300). Upon receiving the signature, target 122 utilizes the signature to determine whether the first data chunk is available in the target domain 120 (e.g., available at targets 124, 126, or 128) (P310). In one implementation, a repository shared by targets 122, 124, 126, and 128 may be utilized to determine whether a data chunk is available in the target domain 120. The shared repository may maintain a history of data chunks received by the target domain 120, as provided in further detail below.

If the first data chunk is available in the target domain 120, target 122 retrieves the first data chunk from the target domain 120 (e.g., targets 124, 126, or 128) (P320). It is noteworthy that if the first data chunk has previously been transferred to the target domain 120 but has subsequently been modified, the signature of the first data chunk received by target 122 will not match the signature of the first data chunk, as modified. In such a scenario, it will be determined that the first data chunk is not available in the target domain 120, and the source domain 110 will be requested to forward the first data chunk again to the target domain 120.

Figure 4:
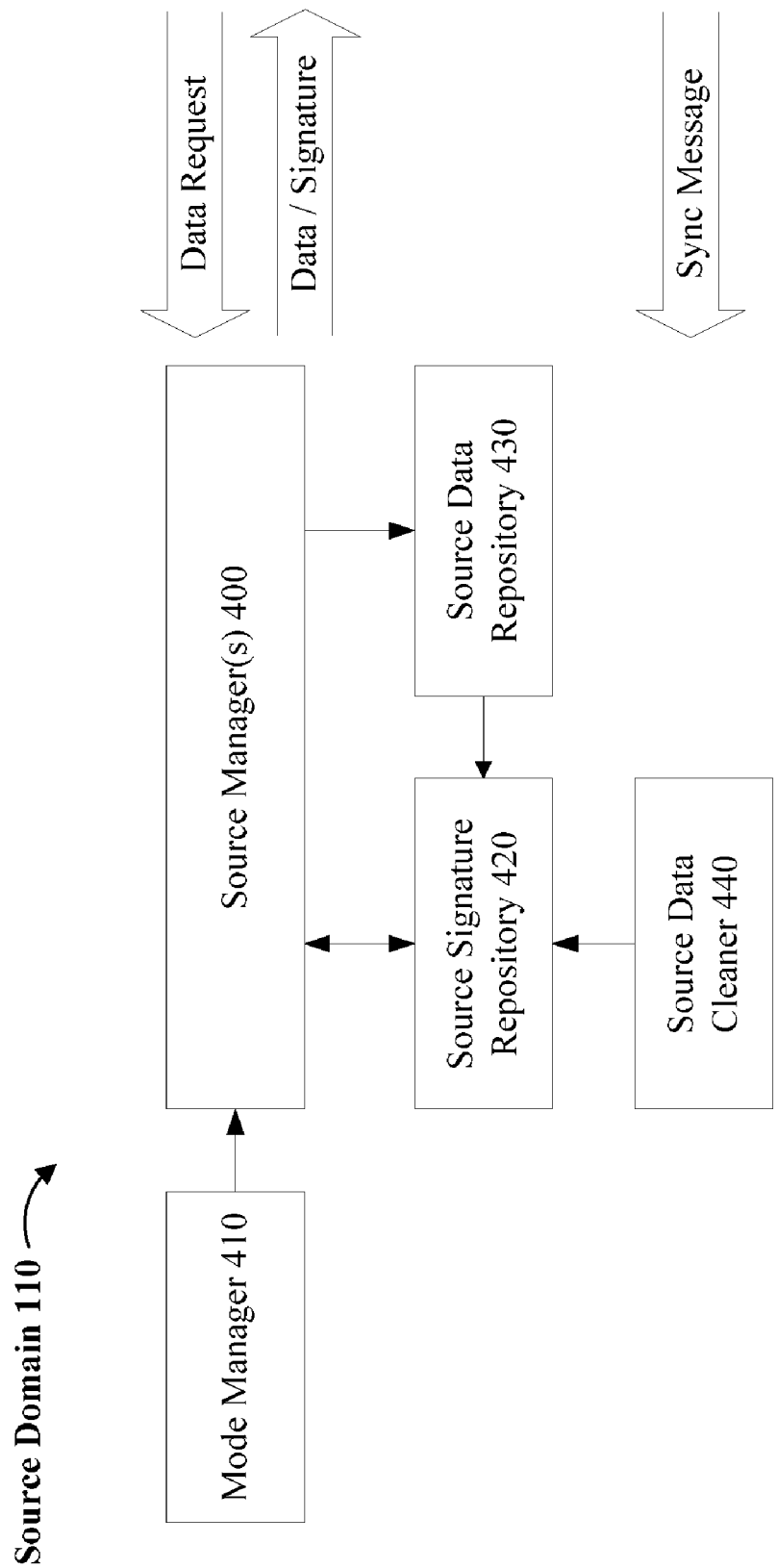
FIG. 4 illustrates additional components of a source domain, in accordance with one embodiment.

Referring to FIG. 4, in accordance with one embodiment, sources 112, 114, 116 may execute respective source managers 400 to manage data requests received from targets 122, 124, 126, 128. The source managers 400 may be part of a distributed software for managing data requests received by the source domain 110. The source domain 110 may further comprise a mode manager 410, a source signature repository 420, a source data repository 430, and a source data cleaner 440. Access to the source signature repository 420 and the source data repository 540 may be shared by the source managers 400. The mode manager 410 may configure sources 112, 114, 116 to transfer data in the optimistic mode or the pessimistic mode according to one or more factors, as provided earlier.

The source signature repository 420 may be a centralized or distributed repository that manages records of signatures transferred to the target domain 120 with their respective data chunks. In one implementation, a record in the source signature repository 420 may comprise a signature of a data chunk and one or more relevant tags. As used herein, relevant tags may include identifier for one or more sources that transferred the data chunk to the target domain 120, identifiers for one or more targets to which the sources transferred the data chunk, data dependency information related to the data chunk (e.g., usage patterns with respect to other data chunks), the time at which the record was created, and the time at which the record was last accessed.

The source signature repository 420 may create a record of a signature of a data chunk when the data chunk is transferred to the target domain 120 for the first time. The record may be updated when the data chunk is subsequently transferred to the target domain 120. For example, the source signature repository 420 may include another source identifier and another target identifier in the tags. Or, the source signature repository 420 may modify the last access time and, if necessary, the data dependency information in the tags.

The source data repository 430 may be a centralized or distributed repository that manages records of data chunks for which a signature is transferred to the target domain 120 instead of a data chunk. In one implementation, a record in the source data repository 430 may comprise a global logical time of the data chunk, a signature of a data chunk, the data chunk, and one or more relevant tags. The global logical time may indicate when the data chunk was transferred to the target domain 120 with respect to other data chunks transferred to the target domain 120.

The source data repository 430 may create a record of a data chunk when a signature of a data chunk is transferred to the target domain 120 without the data chunk for the first time. The record may be updated when the signature is subsequently transferred to the target domain 120 instead the data chunk. For example, the source data repository 430 may replace an existing global logical time of the data chunk with the latest global logical time of the data chunk. The source data repository 430 may include another source identifier and another target identifier in the tags. Or, the source data repository 430 may modify the last access time and, if necessary, the data dependency information in the tags.

The source data cleaner 440 may manage deletion of records from the source data repository 420. In one implementation, the source data cleaner 440 may avoid deleting a record of a data chunk based on whether the record has been recently accessed, whether the record has been frequently accessed, cost to re-create the record, usage pattern of the data chunk, activity level of sources identified in the data chunk, activity level of targets identified in the data chunk, or other factors. For example, the source data cleaner 440 may delete a record of a data chunk if the data chunk is stable and retain the record if the data chunk is non-stable. A data chunk is stable if the data chunk will not be requested by the target domain 120 in the future. A data chunk is non-stable if the data chunk may be requested by the target domain 120 in the future.

Figure 5:
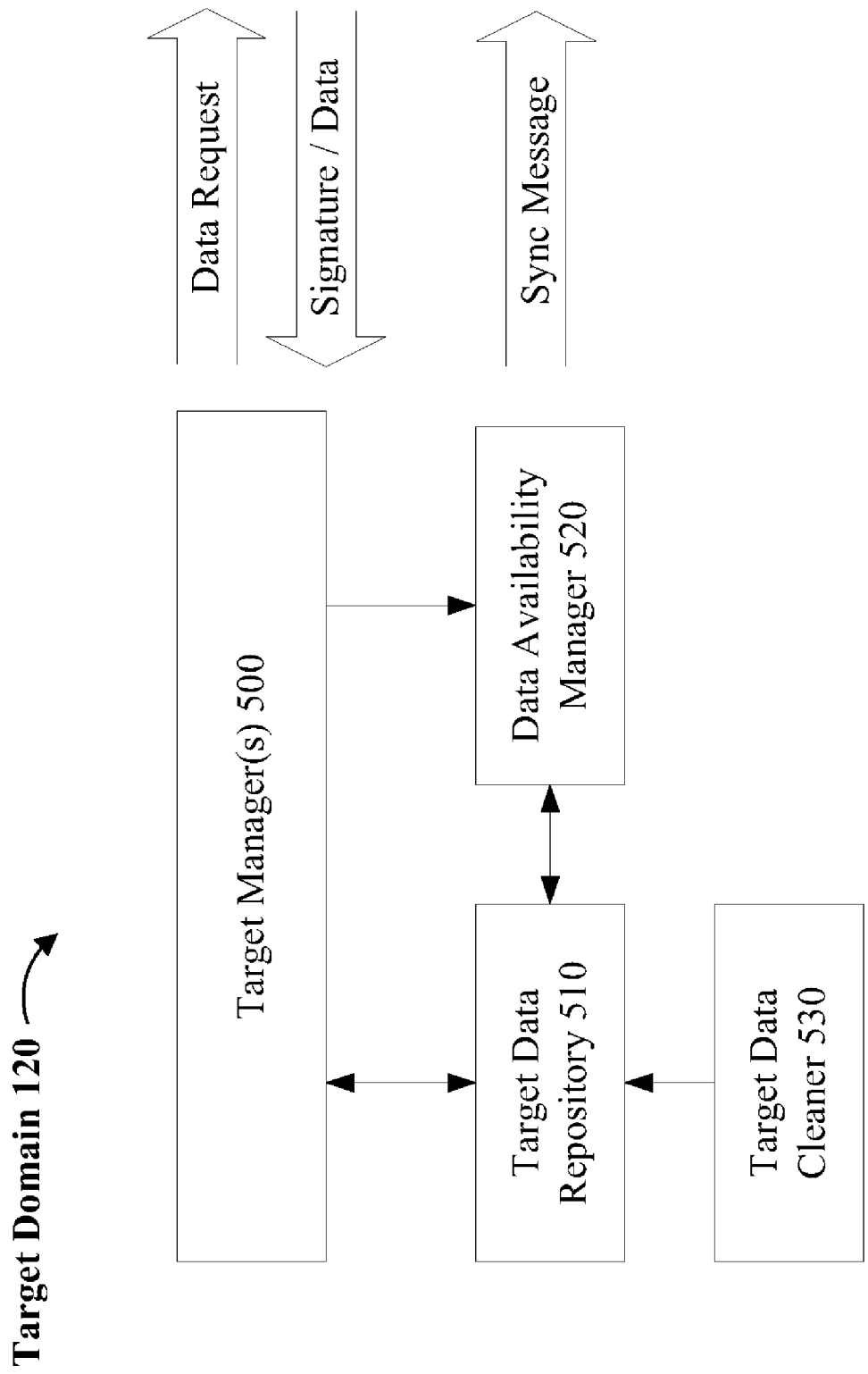
FIG. 5 illustrates additional components of a target domain, in accordance with one embodiment.

Referring to FIG. 5, in accordance with one embodiment, targets 122, 124, 126, 128 may execute respective target managers 500 to request and receive data from sources 112, 114, 116. The target domain 120 may further comprise a target data repository 510, a data availability manager 520, and a target data cleaner 530. Access to the target data repository 510 and the data availability manager 520 may be shared by the targets managers 500.

The target data repository 510 may be a centralized or distributed repository that manages records of data chunks received by the target domain 120. In one implementation, a record in the target data repository 510 may comprise a signature of a data chunk received by the target domain 120, the data chunk, and one or more relevant tags. In another implementation, a record in the target data repository 510 may further comprise a global logical time of the data chunk.

The target data repository 510 may create a record of a data chunk when the data chunk is received by the target domain 120 for the first time. The record may be updated when the target data repository 510 provides the data chunk to a target. For example, the target data repository 510 may add another target identifier. Or, the target data repository 510 may modify the last access time and, if necessary, the data dependency information.

The data availability manager 520 may be a shared application that manages availability of data chunks stored in the source domain 110 and the target domain 120. The data availability manager 520 may retrieve a data chunk from a record of the data chunk in the target data repository 510, in response to receiving a request for the data chunk from a target. If the record does not exist in the target data repository 510, the data availability manager 520 may retrieve the record from the source data repository 430. The data availability manager 520 may also maintain an internal global logical time that indicates when the latest data chunk was received from the source data repository 430.

The target data cleaner 530 may manage deletion of records from the target data repository 510 according to a certain policy. In one implementation, the target data cleaner 530 may avoid deleting a record of a data chunk based on whether the record has been recently accessed, whether the record has been frequently accessed, cost to re-create the record, usage pattern of the data chunk, activity level of sources identified in the data chunk, activity level of targets identified in the data chunk, or other factors.

In one implementation, synchronization between the source domain 110 and the target domain 120 may be performed according to a loose synchronization protocol such as an enhanced wide area network (WAN) de-duplication protocol. In such an implementation, the data availability manager 520 may periodically submit a synchronization protocol message with the internal global logical time to the source domain 110. The source data cleaner 440 and the target cleaner 630 may utilize the internal global logical time to delete stable records (i.e., records including a global logical time less than the internal global logical time) from the source data repository 430 and the target data repository 510, respectively.

Figure 6:
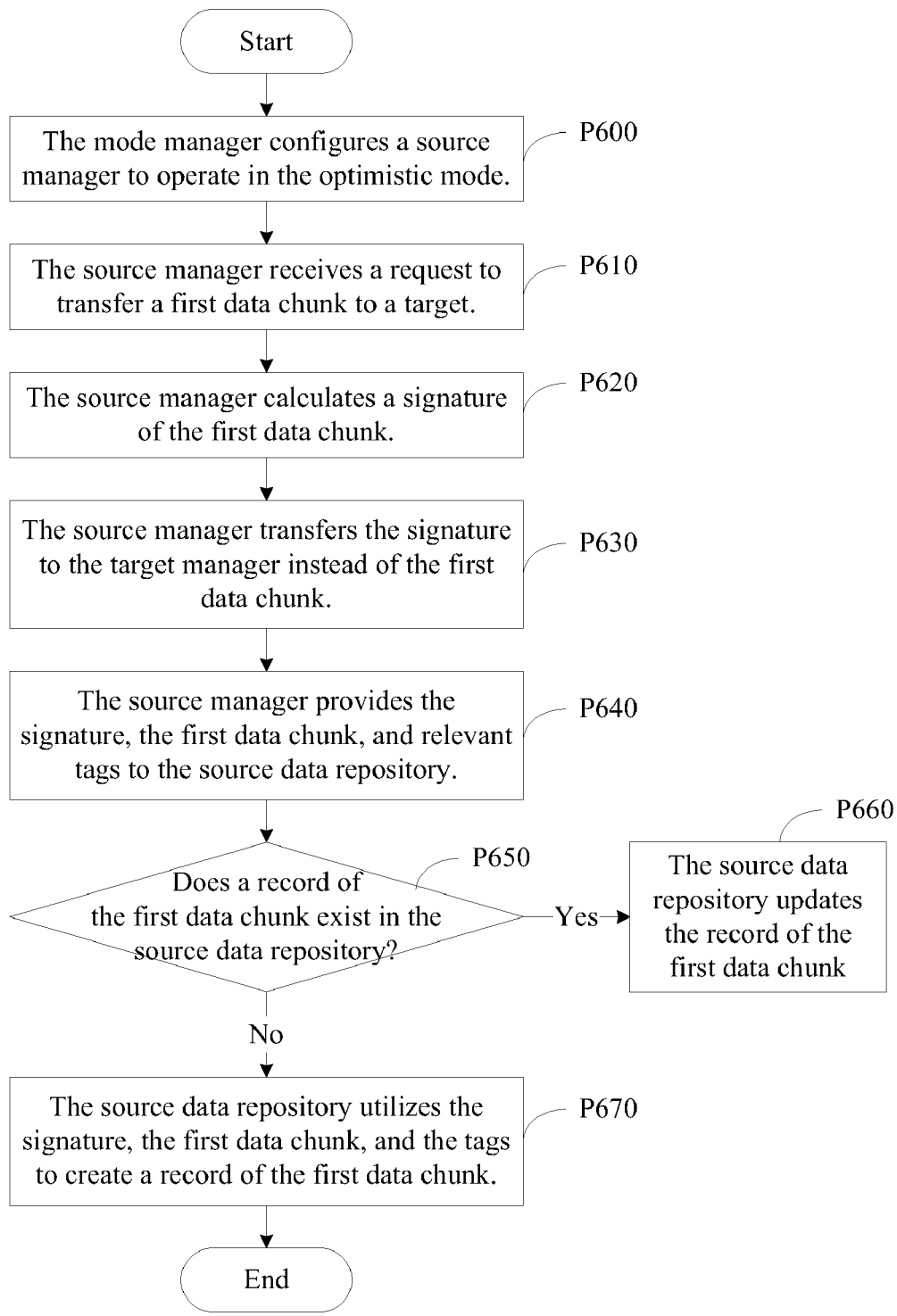
FIG. 6 is a flow diagram of a method for transferring a data chunk to a target in an optimistic mode, in accordance with one embodiment.
Figure 7A:
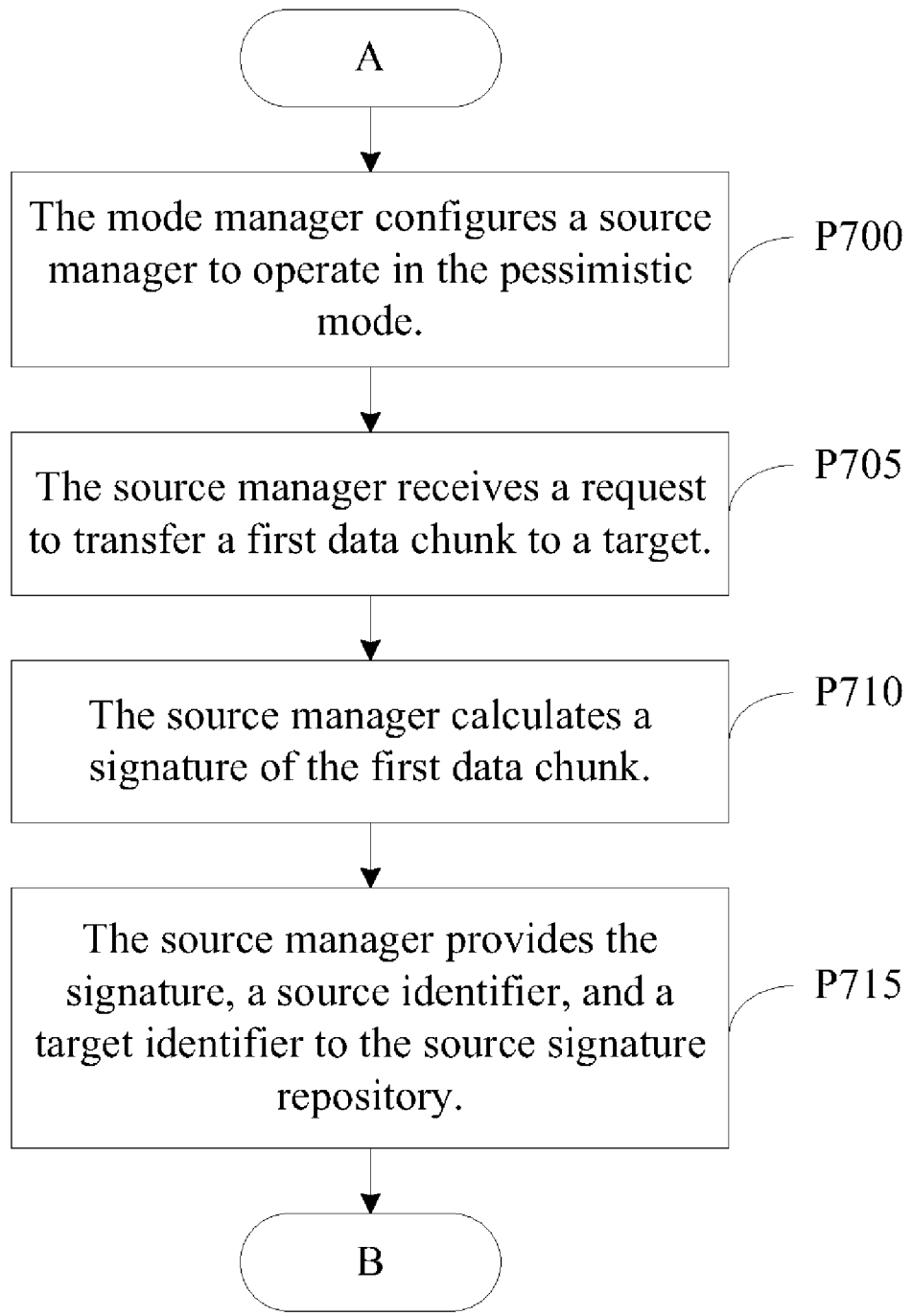
FIG. 7A through 7C is a flow diagram of a method for transferring a data chunk to a target in a pessimistic mode, in accordance with one embodiment.
Figure 7B:
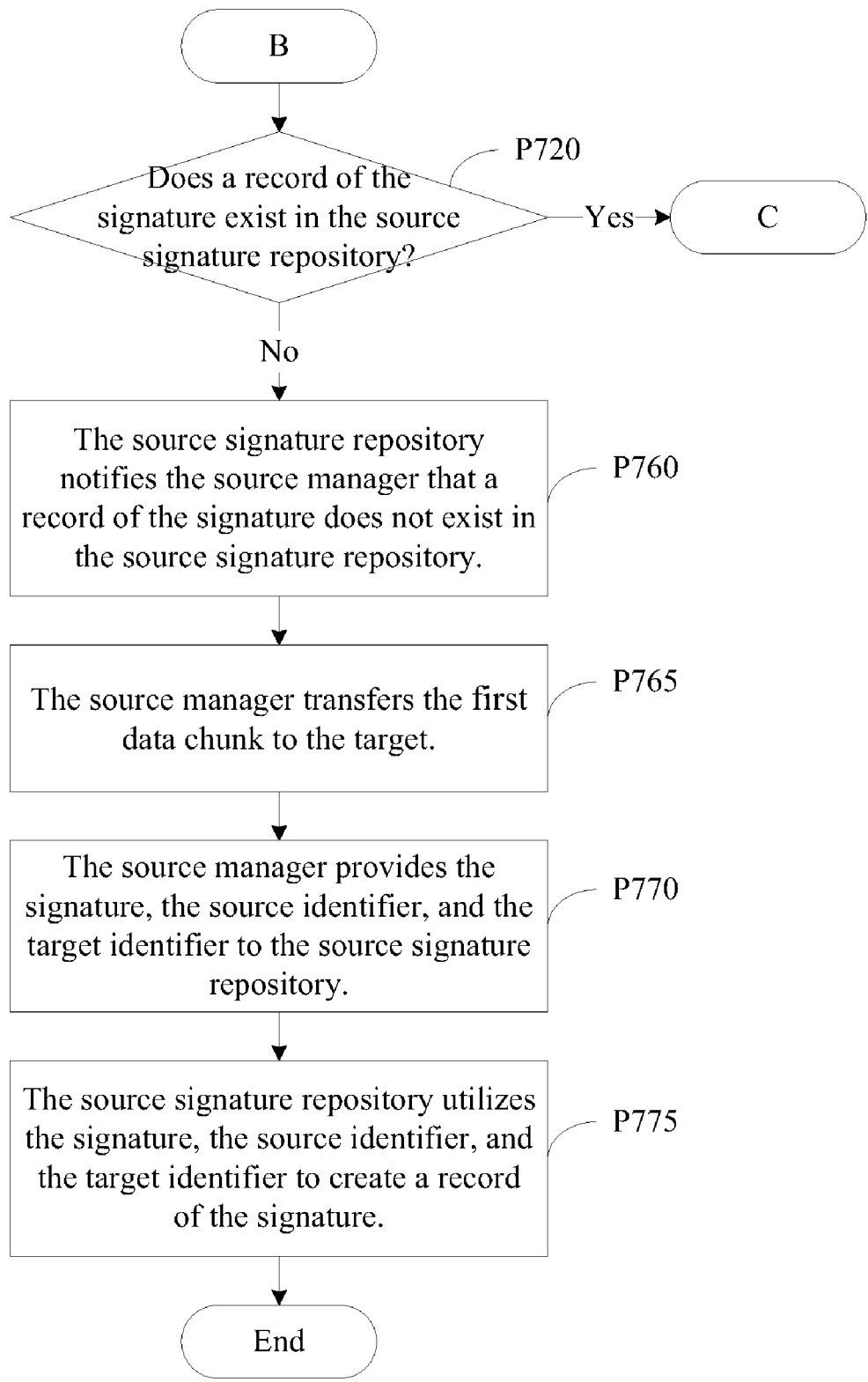
Figure 7C:
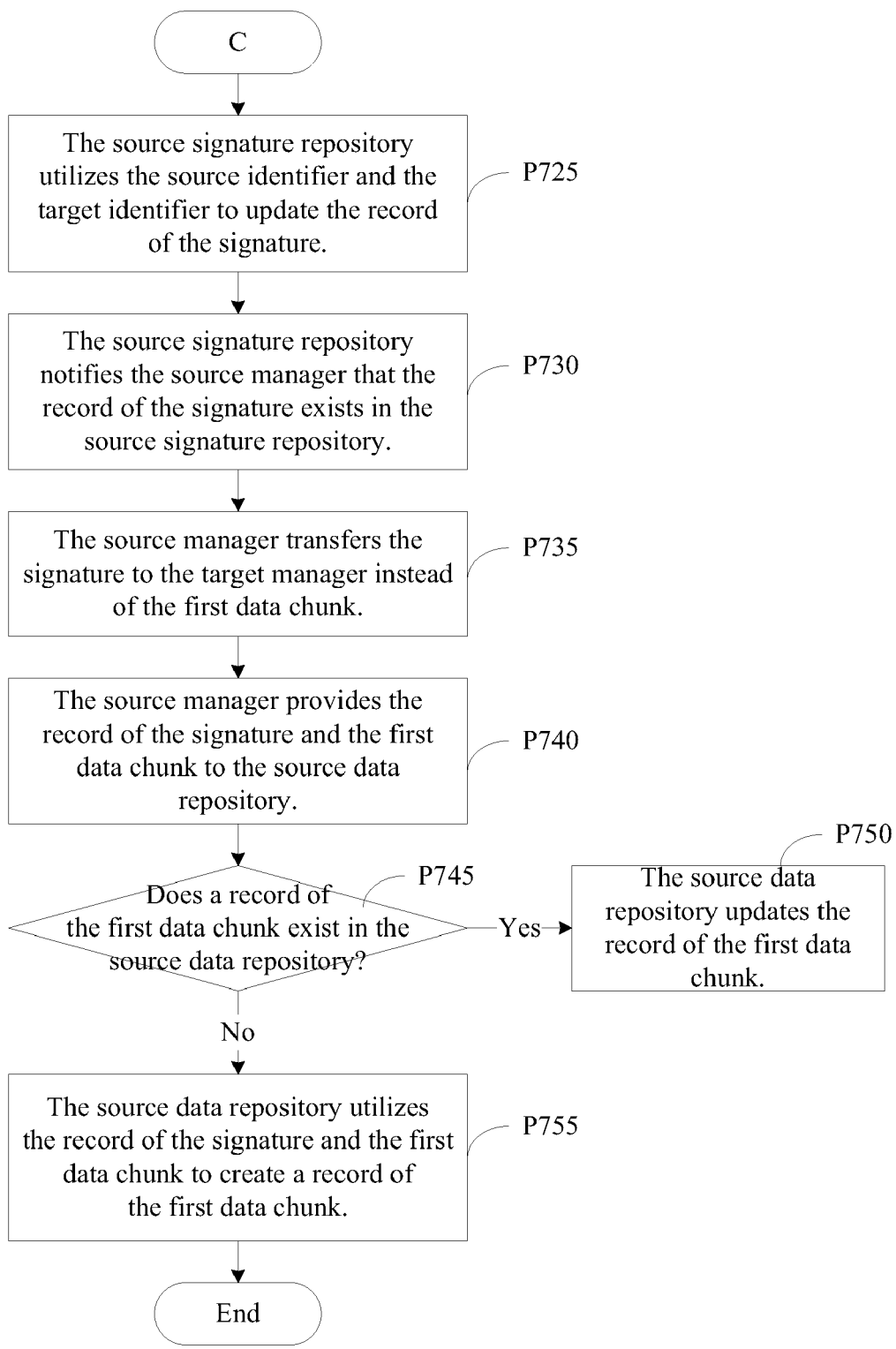

Referring to FIGS. 4 through 6, in accordance with one embodiment, the mode manager 410 may configure a source manager 400 to operate in an optimistic mode (P600). In response to receiving a request to transfer data (e.g., a first data chunk) to a target manager 500, the source manager 400 calculates a signature of the first data chunk and transfers the signature to the target manager 500 instead of the first data chunk (P610-P630). Upon transferring the signature to the target manager 500, the source manager 400 provides the signature, the first data chunk, and one or more relevant tags to the source data repository 430) (P640).

The source data repository 430 utilizes the signature to determine whether a record of the first data chunk exists in the source data repository 430 (i.e., whether the signature has previously been transferred to the target domain 120 instead of the first data chunk) (P650). If a record of the first data chunk exists in the source data repository 430, the source data repository 430 updates the record (e.g., by replacing the existing global logical time with the latest global logical time) (P660). Otherwise, the source data repository 430 utilizes the signature, the first data chunk, and the tags to create a record of the first data chunk (P670).

Referring to FIGS. 4, 5, and 7A through 7C, in accordance with one embodiment, the mode manager 410 may configure a source manager 400 to operate in a pessimistic mode (P600). In response to receiving a request to transfer data (e.g., a first data chunk) to a target manager 500, the source manager 400 calculates a signature of the first data chunk and provides the signature, a source identifier, and a target identifier to the source signature repository 420 (P705-P715).

The source signature repository 420 utilizes the signature to determine whether a record of the signature exists in the source signature repository 420 (i.e., whether the first data chunk has previously been transferred to the target domain 120) (P720). If a record of the signature exists in the source signature repository 420, the source signature repository 420 utilizes the source identifier and the target identifier to update the record (e.g., by including the source identifier and the target identifier in the tags) and notifies the source manager 400 that the record exists in the source signature repository 420 (P725, P730). The source manager 400 transfers the signature to the target manager 500 instead of the first data chunk (P735).

Upon transferring the signature to the target manager 500, the source manager 400 provides the record of the signature and the first data chunk to the source data repository 430 (P740). The source data repository 430 utilizes the signature included in the record to determine whether a record of the first data chunk exists in the source data repository 430 (i.e., whether the signature has previously been transferred to the target domain 120 instead of the first data chunk) (P740). If a record of the first data chunk exists in the source data repository 430, the source data repository 430 updates the record (e.g., by replacing the existing global logical time with the latest global logical time) (P750). Otherwise, the source data repository 430 utilizes the record of the signature and the first data chunk to create a record of the first data chunk (P755).

If a record of the signature does not exist in the source signature repository 420, the source signature repository 420 notifies the source manager 400 that a record of the signature does not exist in the source signature repository 420 (P760). The source manager 400 transfers the first data chunk to the target manager 500 (P765). Upon transferring the first data chunk to the target manager 500, the source provides the signature, the source identifier, and the target identifier to the source signature repository 420 (P770). The source signature repository 420 utilizes the signature, the source identifier, and the target identifier to create a record of the signature (P775).

Figure 8:
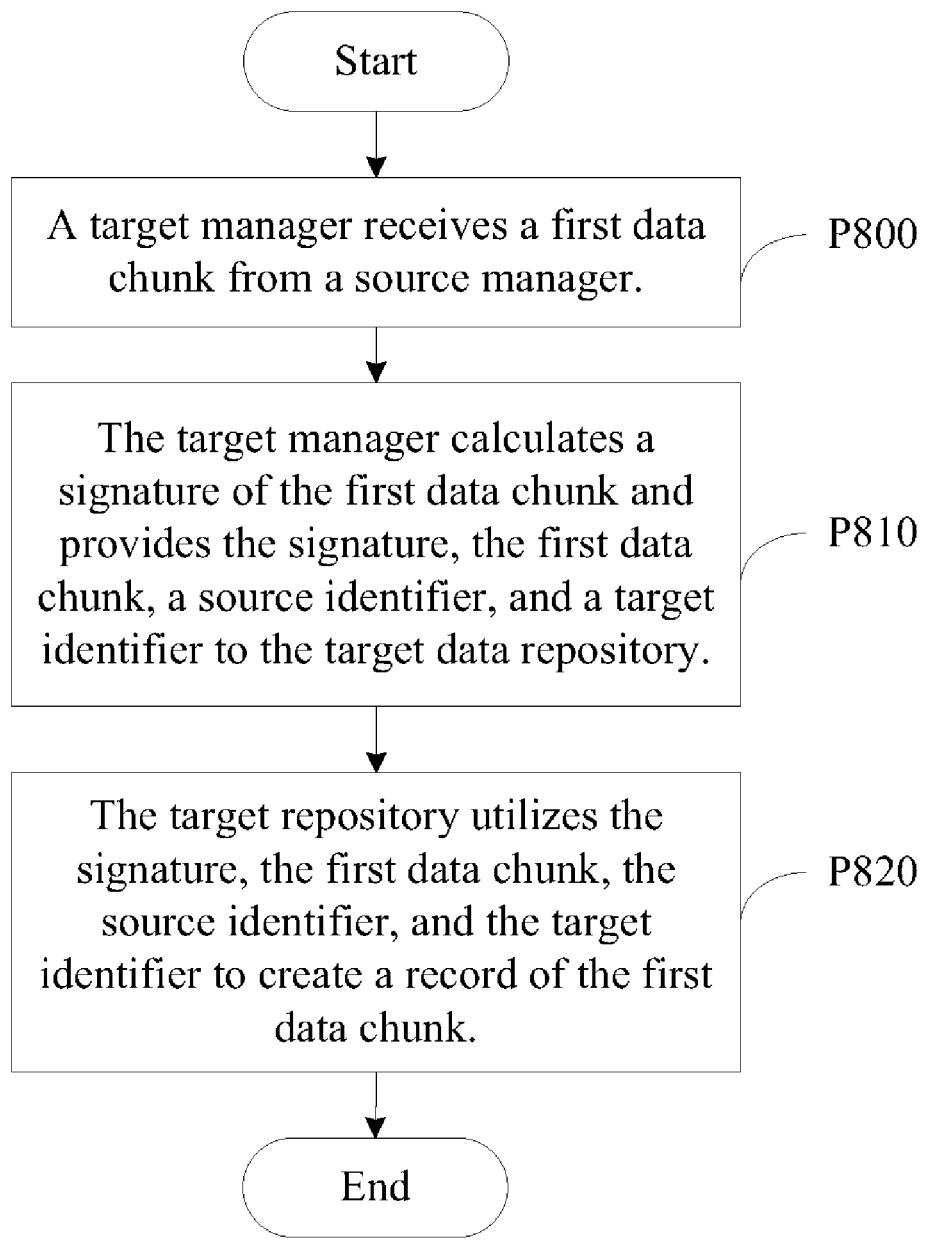
FIG. 8 is a flow diagram of a method for processing a data chunk received from a source, in accordance with one embodiment.
Figure 9A:
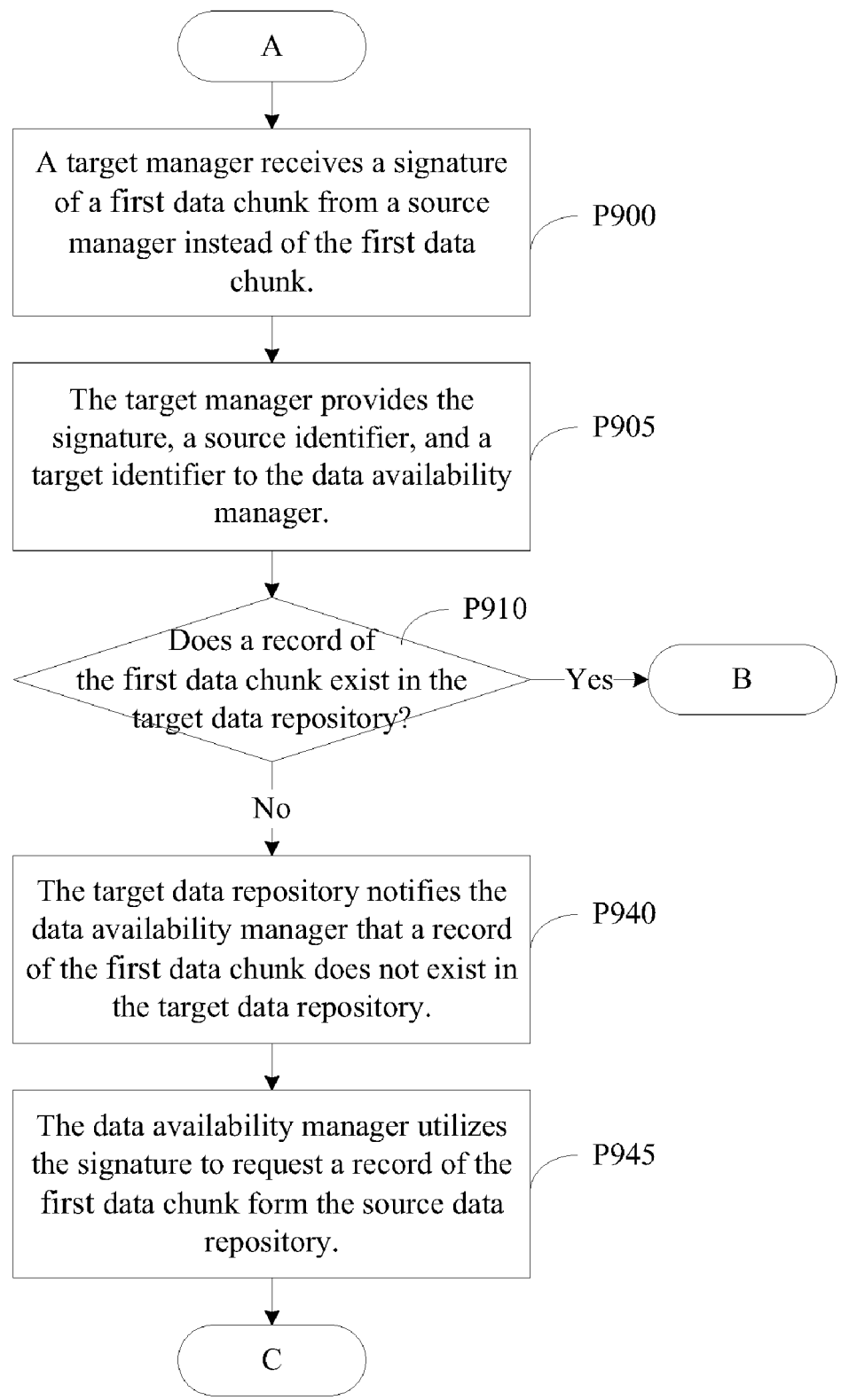
FIGS. 9A through 9C are flow diagrams of a method for processing a signature received from a source, in accordance with one embodiment.
Figure 9B:
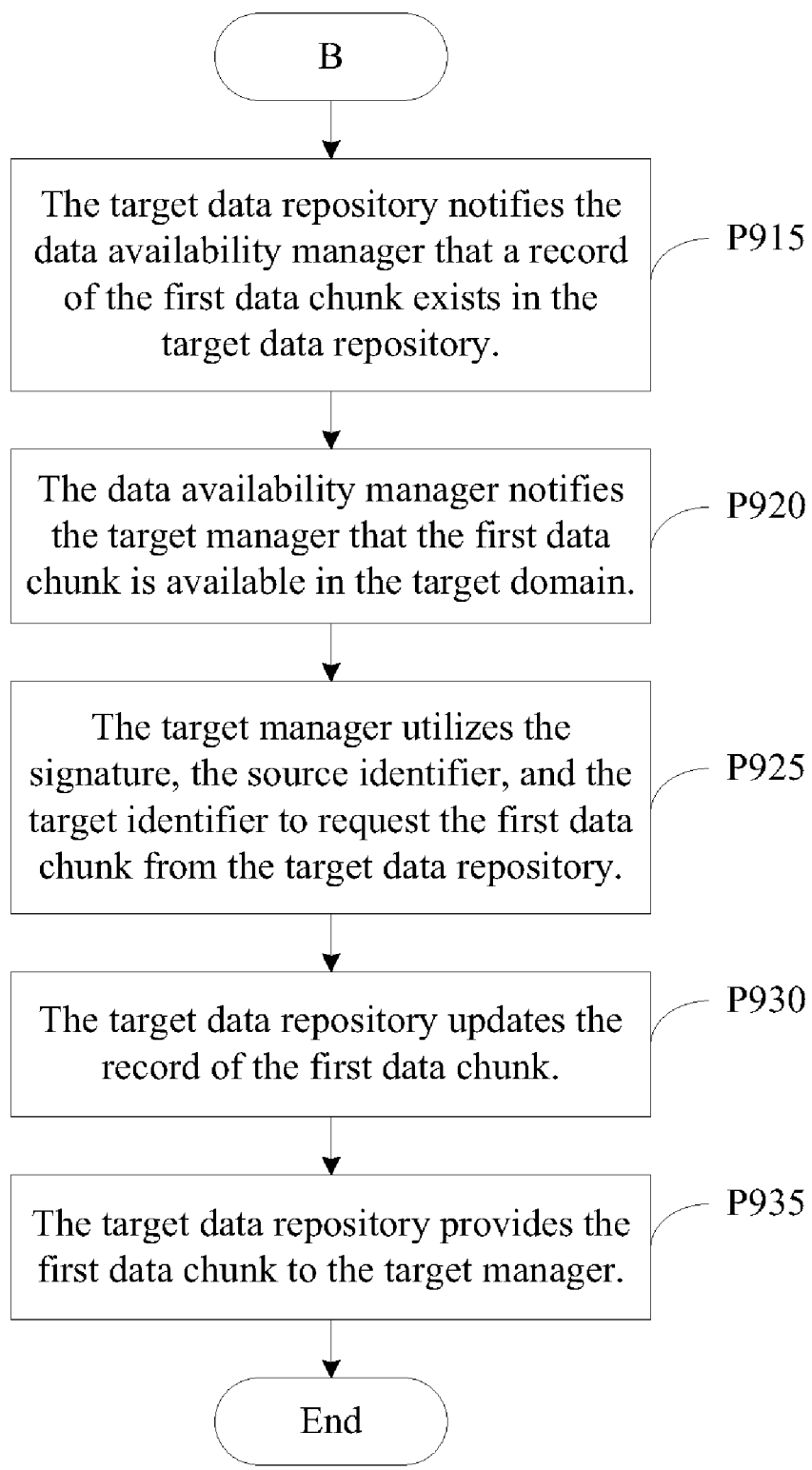
Figure 9C:
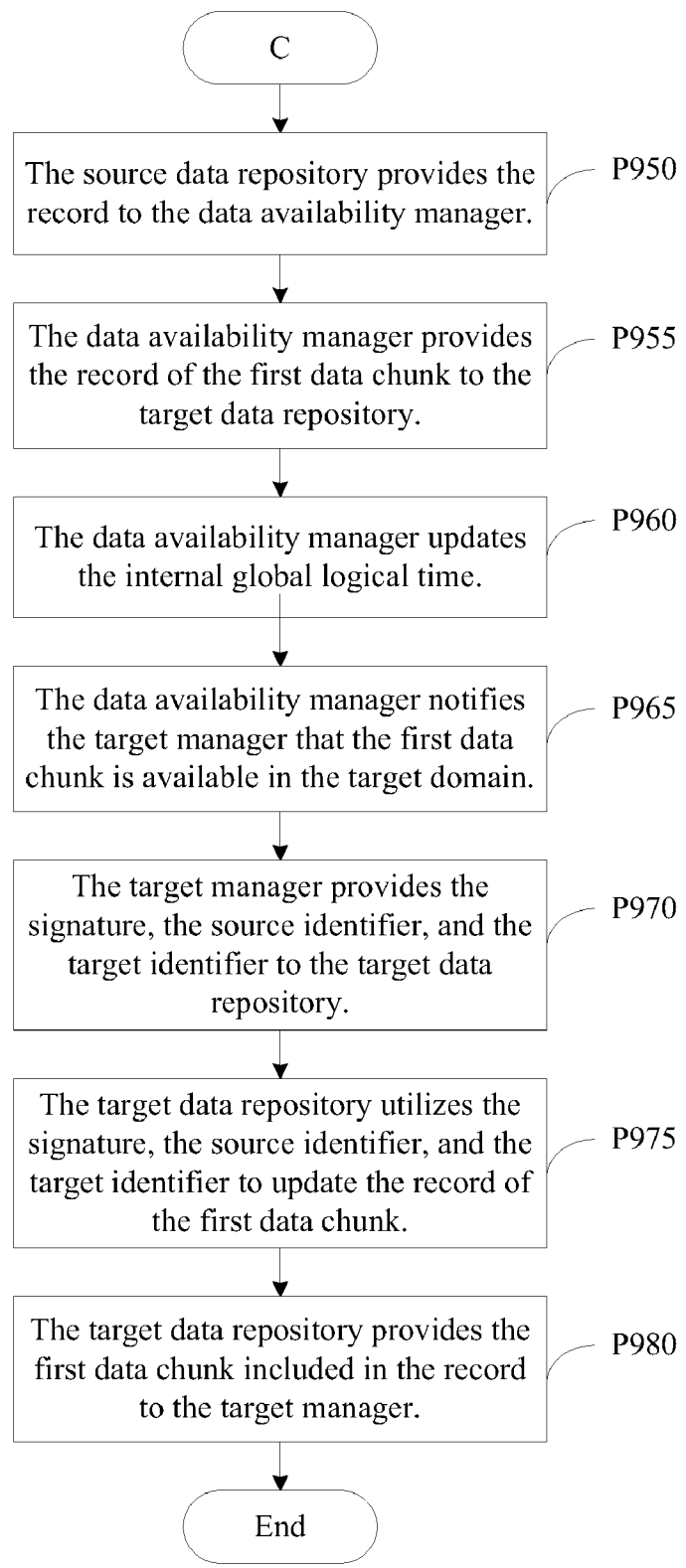

Referring to FIGS. 4, 5, and 8, in accordance with one embodiment, a target manager 500 may receive the first data chunk from a source manager 400 (P800). In response to receiving the first data chunk from the source manager 400, the target manager 500 calculates a signature of the data chunk and provides the signature, the first data chunk, a source identifier, and a target identifier to the target data repository 510 (P810). The target data repository 510 utilizes the signature, the first data chunk, the source identifier, and the target identifier to create a record of the first data chunk (P820).

Referring to FIGS. 4, 5, and 9A through 9C, in accordance with one embodiment, a target manager 500 may receive a signature of a first data chunk from a source manager 400 instead of the first data chunk (P900). In response to receiving the signature from the source manager 400, the target manager 500 provides the signature, a source identifier, and a target identifier to the data availability manager 520 (P905). The data availability manager 520 utilizes the signature to determine whether a record of the first data chunk exists in the target data repository 510 (i.e., whether the first data chunk is available in the target domain 120) (P910).

If a record of the first data chunk exists in the target data repository 510, the target data repository 510 notifies the data availability manager 520 that the record exists in the target data repository 510 (P915). The data availability manager 520 notifies the target manager 500 that the first data chunk is available in the target domain 120 (P920). The target manager 500 utilizes the signature, the source identifier, and the target identifier to request the first data chunk from the target data repository 510 (P925). The target data repository 510 updates the record of the first data chunk and provides the first data chunk included in the record to the target manager 500 (P930, P935).

If a record of the first data chunk does not exist in the target data repository 510, the target data repository 510 notifies the data availability manager 520 that a record of the first data chunk does not exist in the target data repository 510 (P940). The data availability manager 520 utilizes the signature to request a record of the first data chunk from the source data repository 430 (P945). The source data repository 430 provides the record to the data availability manager 520 (P950).

The data availability manager 520 provides the record of the first data chunk to the target data repository 510, updates the internal global logical time, and notifies the target manager 500 that the first data chunk is available in the target domain 120 (P955-P965). The target manager 500 provides the signature, the source identifier, and the target identifier to the target data repository 510 (P970). The target data repository 510 utilizes the signature, the source identifier, and the target identifier to update the record of the first data chunk and provide the first data chunk included in the record to the target manager 500 (P975, P980).

In an alternative embodiment, the source domain 110 and the target domain 120 may be the same domain. That is, the nodes in the source domain 110 and the target domain 120 may serve as both sources and targets. In such an embodiment, one or more components in the source domain 110 and the target domain 120 may be integrated to save space or make better decisions (e.g., select better sources for transferring data to a target). In one implementation, for example, the source data repository 430 may be integrated with the target data repository 510.

The systems and methods provided above may support improved data transfer with respect to cost and latency, dynamically changing sources and targets (e.g., changes in membership and connectivity), flexibility in selecting sources and targets (e.g., data may be transferred from a main source instead of a branch source), and scalability with increased numbers of sources and targets without bottlenecks in performance. Additionally, the collaboration between sources, collaboration between targets, and collaboration between sources and targets described above may allow reduction of actual transfer size of data (i.e., what to send), negotiation of data transfer sources (i.e., where to send from), negotiation of data transfer targets (i.e., where to send to), negotiation of time of transfer (i.e., when to send), and negotiation of data transfer protocol (i.e., how to send).

In different embodiments, the disclosed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 10:
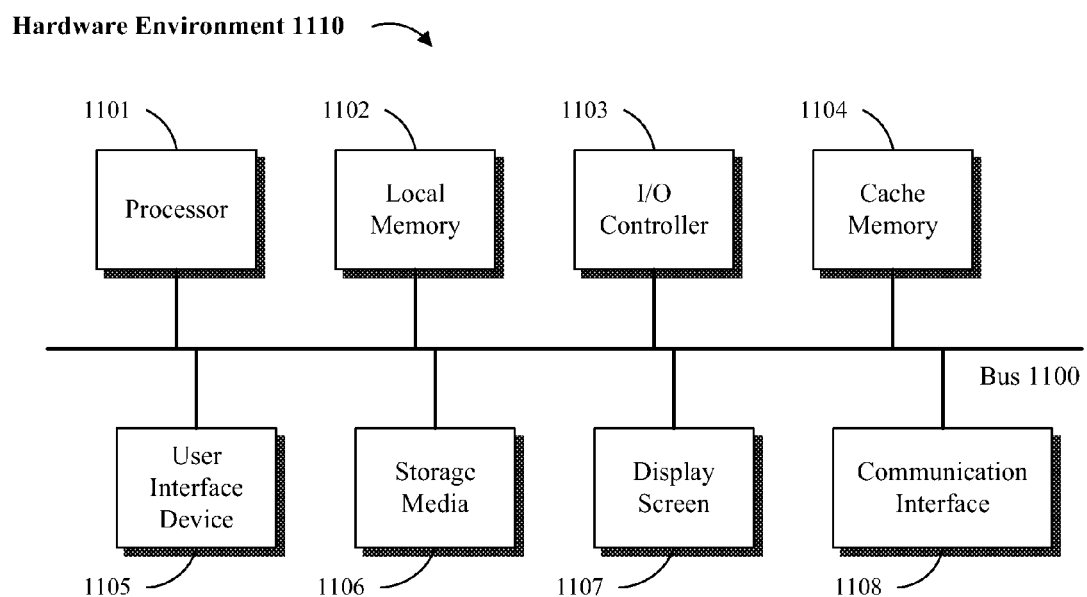
FIGS. 10 and 11 are block diagrams of hardware and software environments in which a system of the present invention may operate, in accordance with one or more embodiments.
Figure 11:
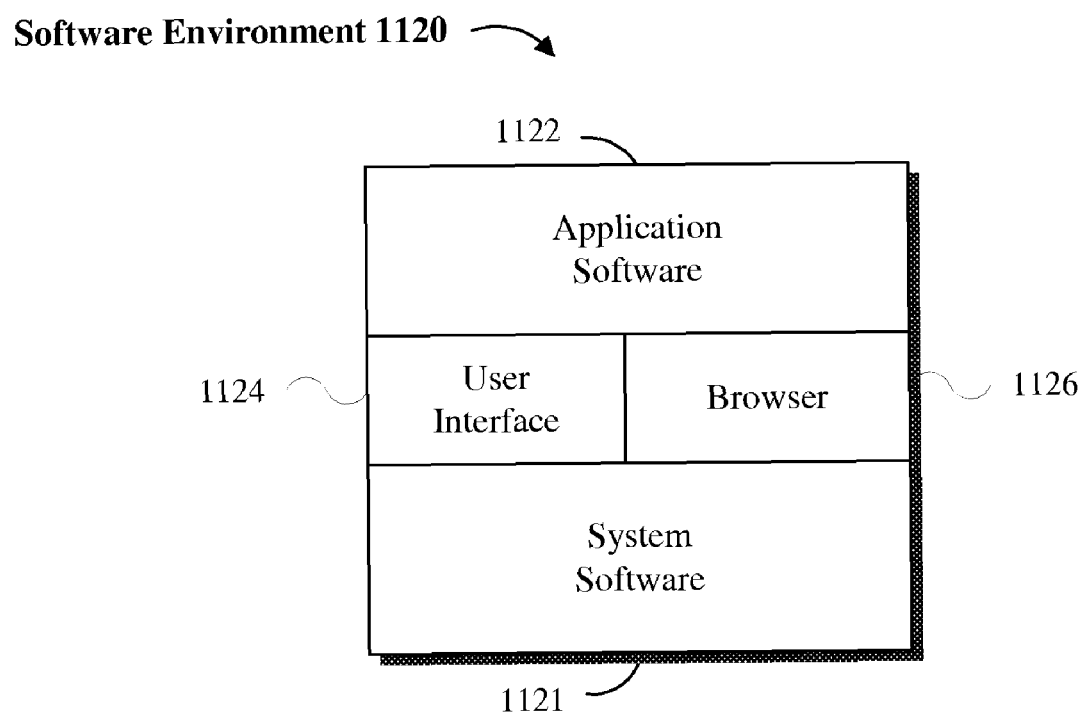

Referring to FIGS. 10 and 11, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 10, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 11, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for managing data transfer in a network environment, the method comprising:
    receiving a request to transfer first data from a first source in a source domain comprising a plurality of sources to a first target in a target domain comprising a plurality of targets;
    transferring a signature of the first data to the first target instead of the first data, in response to determining that the first source is configured to transfer data in a first mode;
    transferring the signature to the first target instead of the first data, in response to determining that the first source is configured to transfer data in a second mode and the first data has previously been transferred to the target domain; and
    transferring the first data to the first target, in response to determining that the first source is configured to operate in the second mode and the first data has not previously been transferred to the target domain.

2. The method of claim 1, wherein the first target utilizes the signature to determine whether the first data is available in the target domain, in response to receiving the signature from the first source instead of the first data chunk.

3. The method of claim 2, wherein the first target retrieves the first data from the target domain, in response to receiving the signature and determining that the first data is available in the target domain.

4. The method of claim 3, wherein the first target retrieves the first data from the source domain, in response to receiving the signature and determining that the first data is not available in the target domain.

5. The method of claim 4, wherein the plurality of sources included in the source domain share access to a first repository utilized to determine whether the first data has previously been transferred to the target domain.

6. The method of claim 5, wherein the plurality of sources included in the source domain share access to a second repository utilized to determine whether the signature has previously been transferred to the target domain instead of the first data.

7. The method of claim 6, wherein the plurality of targets included in the target domain share access to a third repository utilized to determine whether the first data is available in the target domain.

8. The method of claim 7, wherein the source domain and the target domain are a same domain such that a same group of nodes serve as both the plurality of sources and the plurality of targets.

9. The method of claim 8, wherein the second and third repositories are integrated into a single repository.

10. The method of claim 1, wherein synchronization between the source domain and the target domain is performed according to a wide area network (WAN) de-duplication protocol.

11. A system for managing data transfer in a network environment, the system comprising:
a logic unit for receiving a request to transfer first data from a first source in a source domain comprising a plurality of sources to a first target in a target domain comprising a plurality of targets;
a logic unit for transferring a signature of the first data to the first target instead of the first data, in response to determining that the first source is configured to transfer data in a first mode;
a logic unit for transferring the signature to the first target instead of the first data, in response to determining that the first source is configured to transfer data in a second mode and the first data has previously been transferred to the target domain; and
a logic unit for transferring the first data to the first target, in response to determining that the first source is configured to operate in the second mode and the first data has not previously been transferred to the target domain.

12. The system of claim 11, wherein the first target utilizes the signature to determine whether the first data is available in the target domain, in response to receiving the signature from the first source instead of the first data chunk.

13. The system of claim 12, wherein the first target retrieves the first data from the target domain, in response to receiving the signature and determining that the first data is available in the target domain.

14. The system of claim 13, wherein the first target retrieves the first data from the source domain, in response to receiving the signature and determining that the first data is not available in the target domain.

15. The system of claim 14, wherein the plurality of sources included in the source domain share access to a first repository utilized to determine whether the first data has previously been transferred to the target domain.

16. The system of claim 15, wherein the plurality of sources included in the source domain share access to a second repository utilized to determine whether the signature has previously been transferred to the target domain instead of the first data.

17. The system of claim 16, wherein the plurality of targets included in the target domain share access to a third repository utilized to determine whether the first data is available in the target domain.

18. The system of claim 17, wherein the source domain and the target domain are a same domain such that a same group of nodes serve as both the plurality of sources and the plurality of targets.

19. The system of claim 18, wherein the second and third repositories are integrated into a single repository.

20. The system of claim 11, wherein synchronization between the source domain and the target domain is performed according to a wide area network (WAN) de-duplication protocol.

21. A computer program product comprising a non-transitory computer readable storage medium having a computer readable program, wherein the computer readable program when executed on a computer causes the computer to:
receive a request to transfer first data from a first source in a source domain comprising a plurality of sources to a first target in a target domain comprising a plurality of targets;
transfer a signature of the first data to the first target instead of the first data, in response to determining that the first source is configured to transfer data in a first mode;
transfer the signature to the first target instead of the first data, in response to determining that the first source is configured to transfer data in a second mode and the first data has previously been transferred to the target domain; and
transfer the first data to the first target, in response to determining that the first source is configured to operate in the second mode and the first data has not previously been transferred to the target domain.

22. The computer program product of claim 21, wherein the first target utilizes the signature to determine whether the first data is available in the target domain, in response to receiving the signature from the first source instead of the first data chunk.

23. The computer program product of claim 22, wherein the first target retrieves the first data from the target domain, in response to receiving the signature and determining that the first data is available in the target domain.

24. The computer program product of claim 23, The wherein the first target retrieves the first data from the source domain, in response to receiving the signature and determining that the first data is not available in the target domain.

* * * * *